US011144480B2

(12) United States Patent
Dupont De Dinechin et al.

(10) Patent No.: US 11,144,480 B2
(45) Date of Patent: Oct. 12, 2021

(54) ATOMIC INSTRUCTION HAVING A LOCAL SCOPE LIMITED TO AN INTERMEDIATE CACHE LEVEL

(71) Applicant: KALRAY, Orsay (FR)

(72) Inventors: Benoit Dupont De Dinechin, Grenoble (FR); Marta Rybczynska, Grenoble (FR); Vincent Ray, La Tronche (FR)

(73) Assignee: KALRAY, Orsay (FR)

( * ) Notice: Subject to any disclaimer, the term of this patent is extended or adjusted under 35 U.S.C. 154(b) by 259 days.

(21) Appl. No.: 15/452,073

(22) Filed: Mar. 7, 2017

(65) Prior Publication Data
US 2017/0255571 A1 Sep. 7, 2017

(30) Foreign Application Priority Data
Mar. 7, 2016 (FR) .................. FR16 51869

(51) Int. Cl.
*G06F 12/14* (2006.01)
*G06F 9/52* (2006.01)
*G06F 9/30* (2018.01)
*G06F 12/0804* (2016.01)
*G06F 12/0811* (2016.01)
*G06F 12/0815* (2016.01)
*G06F 12/0862* (2016.01)

(52) U.S. Cl.
CPC ........ *G06F 12/1475* (2013.01); *G06F 9/3004* (2013.01); *G06F 9/52* (2013.01); *G06F 12/0804* (2013.01); *G06F 12/0811* (2013.01); *G06F 12/0815* (2013.01); *G06F 12/0862* (2013.01); *G06F 2212/1052* (2013.01); *G06F 2212/283* (2013.01); *G06F 2212/602* (2013.01); *G06F 2212/621* (2013.01)

(58) Field of Classification Search
None
See application file for complete search history.

(56) References Cited

U.S. PATENT DOCUMENTS

| 6,430,657 | B1 * | 8/2002 | Mittal | G06F 12/0837 |
| | | | | 711/118 |
| 7,996,632 | B1 | 8/2011 | Grohoski et al. | |
| 2004/0088496 | A1 * | 5/2004 | Glasco | G06F 12/082 |
| | | | | 711/141 |
| 2010/0332612 | A1 * | 12/2010 | Johnsen | G06F 12/0817 |
| | | | | 709/216 |

(Continued)

FOREIGN PATENT DOCUMENTS

WO 0163240 A2 8/2001
WO 2012/078775 A1 6/2012

*Primary Examiner* — Jared I Rutz
*Assistant Examiner* — Marwan Ayash
(74) *Attorney, Agent, or Firm* — Oliff PLC

(57) ABSTRACT

The invention relates to a method for updating a variable shared between multiple processor cores. The following steps are implemented during execution in one of the cores of a local scope atomic read-modify-write instruction (AFA), having a memory address (a1) of the shared variable as a parameter: performing operations of the atomic instruction in a cache line (L(a1)) allocated to the memory address; and locally locking the cache line (LCK) while authorizing access to the shared variable by cores connected to another cache memory of same level during execution of the local scope atomic instruction.

10 Claims, 2 Drawing Sheets

(56) References Cited

U.S. PATENT DOCUMENTS

| | | |
|---|---|---|
| 2011/0289276 A1 | 11/2011 | O'Sullivan |
| 2012/0137075 A1* | 5/2012 | Vorbach .................. G06F 9/526 711/122 |
| 2012/0304178 A1* | 11/2012 | Grove ..................... G06F 9/522 718/102 |
| 2013/0159812 A1 | 6/2013 | Loh et al. |

* cited by examiner

ATOMIC INSTRUCTION HAVING A LOCAL SCOPE LIMITED TO AN INTERMEDIATE CACHE LEVEL

FIELD

The present disclosure relates to read-modify-write atomic instructions implemented by a multi-core processor having a shared cache memory, usually a cache memory of level-2 or greater.

BACKGROUND

FIG. 1 is a simplified diagram of a four-core processor connected to a system memory MEM, typically a dynamic memory DDR, through two levels of cache memories. Each processor core CPU has its own level-1 cache memory L1. Each pair of cores shares a level-2 cache memory L2. Finally, each cache memory L2 shares access to the system memory MEM. Some processors may have a level-3 cache memory shared between the cache memories L2.

Each cache memory includes a controller CTRL for performing the operations carried out in the cache memory, including ensuring coherence (co) between the cache memories. The processor cores generally operate on virtual addresses, whereas cache memories operate with physical addresses. A memory management unit MMU is thus usually provided between each processor core and the associated controller CTRL for translating the virtual addresses into physical addresses.

In such processors, there may be a need for sharing data between portions of code, or program threads, executed on different cores, which introduces a challenge bearing in mind the multiple cache memories interposed between the cores, which may store different versions of the shared data.

To ensure reliable sharing of data between the multiple cores, read-modify-write atomic instructions are often used, for example the so-called Fetch-and-Add (FA) or Compare-And-Swap (CAS) instructions. A feature of these instructions is that they produce an effect perceived as instantaneous on the content of the system memory. In other words, the various operations composing each atomic instruction, often the reading of a variable, the modification of the variable, and writing back the variable, are executed while guaranteeing the absence of external interference on the variable between reading and writing back.

To guarantee atomicity, a first technique is based on locking the system memory, preventing any access to the memory, or to a memory area, by other processes, even if these processes do not access the variable targeted by the read-modify-write sequence.

Another technique is based on a cache coherence protocol by which a cache line containing the variable targeted by the atomic instruction is acquired in "exclusive" mode by the core executing the instruction. This acquisition causes invalidation of the cache line in the other cache memories, preventing the other cores from accessing the cache line, hence the corresponding memory area of the system memory, until the exclusive mode is raised by the core having acquired it.

This technique limits access restrictions to only the memory area corresponding to the cache line, but it is complex to implement and produces data alignment constraints.

The two techniques yield a common result of temporarily preventing access to the shared variable in memory, one using a mechanism implemented at the system memory level, the other using a mechanism implemented at the cache memory level.

SUMMARY

A multi-core processor is generally provided, comprising a cache memory shared by a group of several cores configured to delegate atomic instructions to the cache memory; in its instruction set, an atomic read-modify-write instruction, taking as a parameter a memory address of a shared variable, wherein the atomic instruction can have a global scope; a cache memory controller configured for receiving and processing each global atomic instruction executed by a given core of the group by globally locking an address space containing the address of the shared variable, to prevent access to the shared variable by any other core during execution of the global atomic instruction. The atomic instruction can also have a local scope, the cache memory controller being configured for processing each local atomic instruction executed by a given core of the group by locally locking a cache line allocated to the address of the shared variable, while authorizing access to the shared variable to cores connected to another cache memory of same level during execution of the local atomic instruction.

The cache memory controller may be configured for using a cache coherence protocol for implementing the global atomic instructions, and for, during execution of a local atomic instruction, locally locking the cache line without invalidating nor locking an analogous cache line in the other cache memory of same-level.

The cache memory controller may alternatively be configured for locking a system memory area containing the shared variable during execution of a global atomic instruction, and for, during execution of a local atomic instruction, accessing the variable in the cache line without locking any area of the system memory.

The global and local scopes of the atomic instructions may be implemented by two respective dedicated instructions of the processor instruction set.

Alternatively, the global and local scopes of the atomic instructions may be implemented by a same instruction of the processor instruction set, and be differentiated by using two distinct virtual address spaces assigned to a same physical address space containing the shared variable, the processor including a memory management unit for performing virtual to physical address translations, and which assigns an "uncached" attribute to the virtual address space associated to the global scope.

The local atomic instruction may be a fetch-and-add instruction, having as an additional parameter an increment value, and the cache controller may be configured to add the increment to the variable.

A method is also provided for updating a variable shared between multiple processor cores, comprising the following steps implemented during execution in one of the cores of a local scope atomic read-modify-write instruction, having a memory address of the shared variable as a parameter: performing operations of the atomic instruction in a cache line allocated to the memory address; and locally locking the cache line while authorizing access to the shared variable by cores connected to another cache memory of same level during execution of the local scope atomic instruction.

The method may comprise the step of locking the cache line without invalidating nor locking an analogous cache line in other cache memories of same level.

The method may comprise the steps of defining the local scope of the atomic instruction through the execution of a dedicated instruction of the processor instruction set; and including a dedicated atomic instruction of global scope in the processor instruction set.

The method may alternatively comprise the steps of translating a physical address space containing the shared variable from first and second distinct virtual address spaces through a memory management unit; assigning an "uncached" attribute to the second virtual address space; executing a generic atomic instruction with the first virtual address space for obtaining a local scope; and executing the same generic atomic instruction with the second virtual address space for obtaining a global scope.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
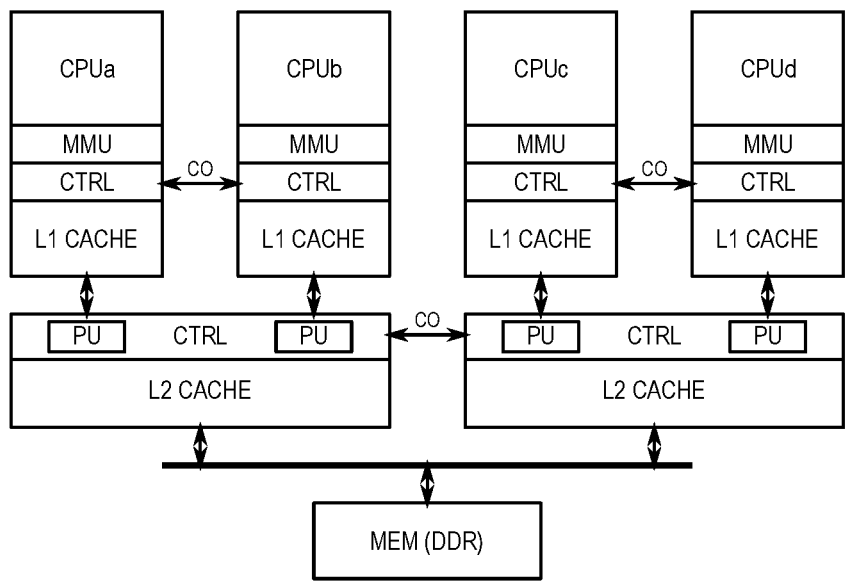
FIG. 1, previously described, is a simplified diagram of a four-core processor having two levels of cache memories.
Figure 2:
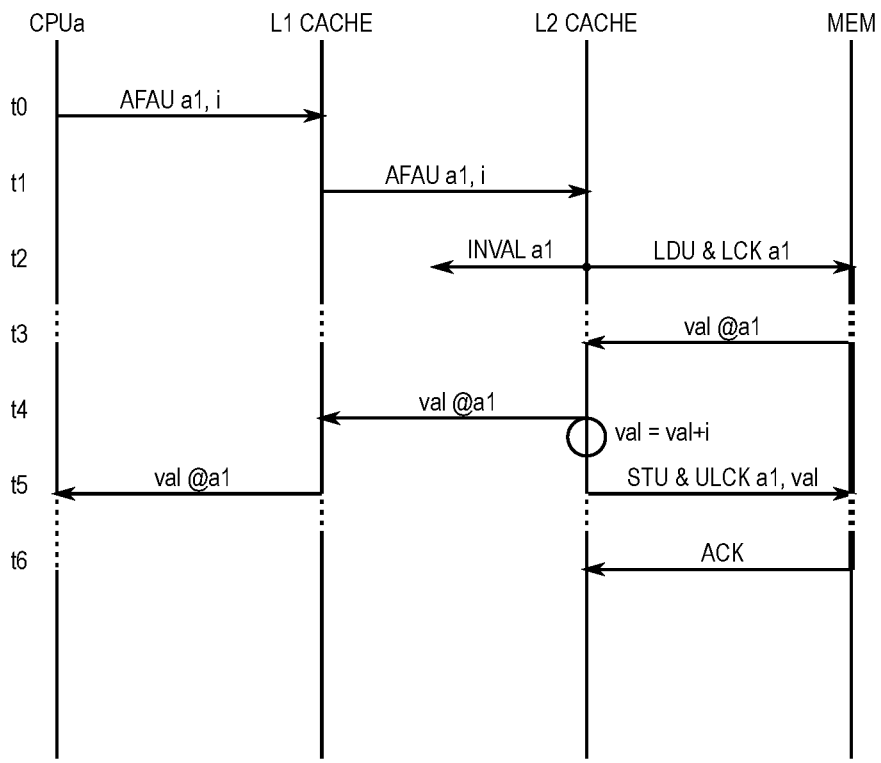
FIG. 2 is a time diagram illustrating an implementation of a conventional atomic fetch-and-add instruction, having a global scope.

FIG. 2 illustrates, through a time diagram, an implementation of a conventional atomic fetch-and-add instruction, as an example, in a system of the type of FIG. 1, using the conventional system memory locking method disclosed above. The instruction is designated "Atomic Fetch-and-Add Uncached" or AFAU, "uncached" meaning that the instruction is effective at the level of the system memory MEM. Such an instruction takes as parameters the address of the shared variable and the increment to add to it. The instruction stalls the core to wait for an acknowledgement, for example the return of the value of the shared variable, before modification.

At a time t0, a core CPUa executes the instruction AFAU a1, i, where parameter a1 is the address of the shared variable and parameter i is the increment to add to it. The atomic instructions may be delegated to one of the cache memories, for example the nearest to the system memory, L2, whose controller may include a processing unit PU designed to implement the operations.

Hence, at time t0, the atomic instruction is transmitted to cache memory L1, who transmits it in turn, at time t1, to cache memory L2.

At a time t2, in response to the atomic instruction, the cache memory L2 executes a LoaD Uncached command LDU at address a1, which command is combined with a command LCK for locking the memory area containing the address a1. The memory MEM responds by locking the area, meaning that from time t2 access to the memory area is reserved exclusively to the core CPUa having executed the atomic instruction. The interval during which the memory area is locked is shown by a bold line.

Moreover, the execution of such an uncached command may trigger the coherence mechanism of the cache memories, for instance by invalidating the cache line allocated to the address a1 in all the cache memories (INVAL a1). Hence, another core that attempts to read the variable causes its cache memory to refresh with the updated variable from the system memory. If such an access occurs while the memory area is locked, the core is stalled until the memory area is unlocked.

At a time t3, in response to the load command LDU, the memory returns the value val of the variable stored at the address a1. A relatively large number of clock cycles may elapse between the execution of the command LDU and the return of the value val.

At a time t4, the cache memory L2 transmits the read value val to the cache memory L1 and locally adds the increment i to the value val.

At a time t5, the cache memory L1 transmits the read value val to the core CPUa while cache memory L2 executes a STore Uncached command STU for storing the modified value of the variable at address a1, which command is combined with a command ULCK for unlocking the memory area containing address a1.

At a time t6, in response to command STU, the system memory transmits to the cache memory L2 an acknowledgement signal ACK indicating that the memory area is unlocked. A relatively large number of clock cycles may elapse between the execution of the command STU and the transmission of the acknowledgement signal ACK. The system memory thus unlocks the memory area containing address a1.

From time t6, the other cores may access the updated shared variable in the system memory. If another core has requested read access to the shared variable between times t2 and t6, the variable is retrieved only from time t6.

The effects of the commands LDU and STU executed in the cache memory L2, more precisely by the cache controller, may be similar to the responses of the cache memory to instructions of similar names executed by the core. This means that the cache line allocated to the address a1 is updated by these instructions. Hence, after execution of the store command STU, the cache line is up to date with the current value in memory of the variable.

The system memory lock duration, shown by a bold line, may be relatively long, since the latency of the system memory may be expressed in hundreds of core clock cycles. This latency occurs twice for each atomic instruction, a first time for the load command LDU, and a second time for the store command STU. While the system memory is locked, no other process has access thereto and is stalled, even if the process does not access the shared variable. The memory may be partially locked, for instance by memory banks, but such areas remain relatively large, so that their locking is detrimental to system performance.

In processors of the type of FIG. 1, cache memories may be shared between multiple cores, for instance two or four cores for a level-2 cache memory. Some processors may have a level-3 cache memory that can be shared by even more cores. Moreover, in many situations, the allocation of program threads to cores may be customized so that interdepending threads are allocated to cores sharing a same cache memory. For instance, in FIG. 1, two interdependent threads would be allocated respectively to cores CPUa and CPUb, or CPUc and CPUd.

In addition, a variable shared by a group of interdependent threads generally has no utility for other processes, especially processes that may be executed on cores that do not share the cache memory. In other words, the other processes do not require access to an up-to-date value of the shared variable.

On the basis of these findings, it is proposed herein to introduce atomic instructions having a local scope in the instruction set of the processor. More specifically, such an instruction is atomic only up to an intermediate cache level. In a processor including several levels of shared cache memories, it is preferred to attribute the local scope atomic instruction to the shared cache memory closest to the cores.

The processor instruction set may include, in addition to a family of conventional atomic instructions (that will be qualified hereinafter as having a global scope), a family of analogous atomic instructions having a local scope. Thus, for instance, if the processor includes a conventional atomic fetch-and-add uncached instruction AFAU, the instruction set may be augmented by an analogous local scope or "cached" atomic instruction AFA.

Then, conventional, global atomic instructions may be used in interdependent threads executed on any combination of cores that do not necessarily share the same cache memory, while new, local atomic instructions may be used in interdependent threads that are executed on cores that share a cache memory.

Figure 3:
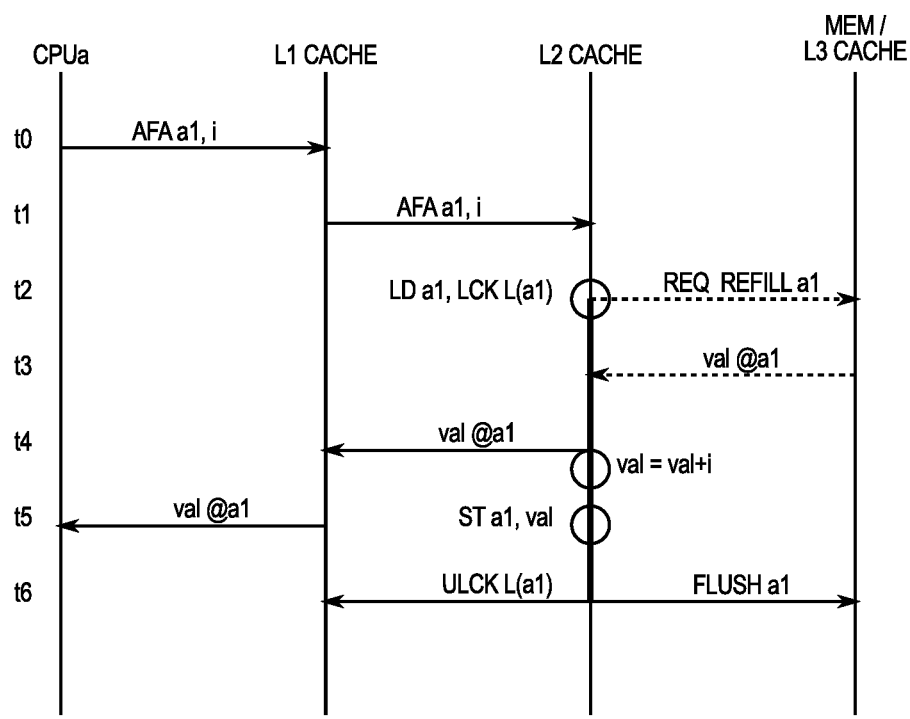
FIG. 3 is a time diagram illustrating an implementation of an atomic fetch-and-add instruction having a local scope.

FIG. 3 is a time diagram illustrating an exemplary implementation of a local atomic fetch-and-add instruction in the context of the processor example of FIG. 1. In the processor of FIG. 1, the shared cache memory closest to the cores is that of level-2 (L2). The local atomic instructions may then be attributed to the cache memories L2, whose controller may be configured to process them.

At a time to, the core CPUa executes an instruction AFA a1, i, where parameter a1 is the address of the shared variable and i is the increment to add thereto. The instruction is attributed to the shared cache memory closest to the cores, L2.

Thus, at time t0, the atomic instruction is transmitted to cache memory L1, who transmits it in turn, at a time t1, to cache memory L2.

At a time t2, in response to the atomic instruction, the cache memory L2 executes a cached load command LD at address a1, which command is associated with a lock command LCK, not for a memory area, but for the local cache line L(a1) allocated to the address a1.

The cache lines may be subject to concurrent access requests by the cores that share the cache memory. In practice, as shown in FIG. 1 for cache memories L2, the cache controller may include processing units PU assigned respectively to the cores, which processing units compete for gaining access to the cache lines. From time t2, access to the cache line L(a1) is reserved exclusively to the core CPUa that executed the atomic instruction. The lock interval is indicated by a bold line.

The effect of the load command LD may be similar to the response of the cache memory to a load instruction of same name executed by the core. This command then causes, through usual cache management mechanisms, a validity checking of the cache line allocated to the address a1, in other words if the cache line is present and has not been invalidated by the coherence management mechanism. If the cache line is invalid or absent (cache-miss), the cache controller requests a refill from the downstream memory, where the downstream memory may be the system memory MEM, or a higher-level cache memory (L3), if the processor has one.

At a time t3, if a refill was requested, the new content of the cache line is received from the downstream memory, including the up-to-date value val of the shared variable at address a1.

Upon refilling a cache line, the interval t2-t3 corresponds to the latency of the downstream memory. However, the likelihood that the cache line is valid is non-negligible, whereby the cache line refill is omitted and interval t2-t3 is zero, since the cache controller can then immediately chain the subsequent operations.

At a time t4, the cache memory L2 transmits the read value val to the cache memory L1 and may then locally add the increment i to the value val.

At a time t5, the cache memory L1 acknowledges the operation to the core CPUa, for instance by transmitting the read value val to the core CPUa. The cache memory L2 executes a command ST for storing the modified value at the address a1. The effect of the store command ST may be similar to the response of the cache memory to a store instruction of same name executed by the core. This command may then cause, by usual cache management mechanisms, updating of the cache line allocated to address a1, and marking the cache line as "dirty". The cache line may then, for example, be transferred to a write-buffer, and be invalidated in the other L2 cache memories by the coherence management mechanism.

According to an alternative, invalidation of the cache line in the other cache memories of same level may be omitted, since the shared variable is shared only among the cores connected to the same cache memory. In other words, the other cores may continue accessing data without latency in their cache line, and will not, in principle, access the obsolete shared variable in this cache line.

At a time t7, as soon as the shared variable is up-to-date in the cache line, the cache line may be unlocked (ULCK) and an acknowledgement may be sent to cache memory L1. From this time, the cache memory L2 may flush its write-buffer to the system memory MEM, or to a higher-level cache memory L3 that relays the flushing to the system memory.

It shall be noted that the lock interval of the cache line is shorter than the lock interval of the system memory in FIG. 2, especially when the shared variable is up-to-date in the cache line, avoiding a read operation in the downstream memory between times t2 and t3.

A significant gain is achieved due to the fact that only the cache line allocated to the address of the shared variable is locked, instead of the system memory. Access to other cache lines at to all the system memory remains authorized to competing cores during local atomic operations.

As previously indicated, in some processor architectures, conventional atomic instructions may be implemented through a second technique, based on a cache coherence protocol by which the cache line containing the shared variable targeted by the atomic instruction is acquired in "exclusive" mode by the core executing the atomic instruction. In such an architecture, an atomic instruction having a local scope limited to a given cache level (for instance L2) improves performance by avoiding the exclusive locking mode, which otherwise requires the exchange of messages between the controllers of same-level cache memories. Moreover, since the cache line is not locked in exclusive mode, the cores connected to another cache memory of same level can still access their cache line as usual.

In the preceding description, it was assumed that the scopes of the atomic instructions (local or global) were differentiated by dedicated atomic instruction families of the processor instruction set, i.e. having distinct opcodes. According to another embodiment, a same family of atomic instructions may be used, that may be qualified as generic, and the scopes are then differentiated by using functionality conventionally offered by a memory management unit MMU. Indeed, an MMU may be configured to assign various memory transaction modes to virtual address spaces, and offers flexibility for translating virtual address spaces to physical address spaces. The memory transaction modes are generally programmable by the operating system in the MMU by setting "attributes" assigned to the virtual address spaces.

It is proposed, in this context, to configure the MMU for translating two distinct virtual address spaces to a same physical address space containing the shared variable, and to differentiate the scope of the atomic instruction by setting the memory transaction mode. The first virtual address space is assigned to the local scope, and a "cached" attribute is used for this purpose. The "cached" mode usually being the default mode, this mode is established without setting a specific attribute in certain systems. The second virtual address space is assigned to the global scope, and an "uncached" attribute is used for this purpose.

The values of the attributes are generally conveyed on separate lines of the address busses, so that they may be taken into account by the cache controllers, in particular. A cache controller thus receives the physical address of the shared variable—translated by the MMU from whichever virtual address space was used by the instruction—and an attribute indicating the scope of the instruction, whose value depends on the virtual address space used by the instruction.

With this configuration, the cache controller may implement a same generic atomic instruction with a local or global scope depending on whether the address passed as a parameter to the instruction for accessing the shared variable is in the first or second virtual address space.

What is claimed is:

1. A processor comprising:
multiple similar cores divided into multiple groups;
distinct cache memories respectively assigned to the groups, each distinct cache memory being shared by the cores of the respective group;
in an instruction set of the processor, an atomic read-modify-write instruction that takes as a parameter a memory address of a shared variable, and has a local scope limited to a group of cores including a core that executes the atomic instruction; and
a cache memory controller configured to:
process each local scope atomic instruction executed by a core of a given group by locally locking in the distinct cache memory of the given group a cache line allocated to the address of the shared variable, while simultaneously authorizing read and write access to the shared variable to cores outside the given group during execution of the local scope atomic instruction.

2. The processor of claim 1, wherein the cache memory controller is configured to execute a cache coherence protocol, and to, during execution of the local atomic instruction, locally lock the cache line without invalidating or locking an analogous cache line in the other cache memories.

3. The processor of claim 1, wherein the cache controller is configured to process the local scope atomic instruction, without locking any area of a system memory shared by all groups of cores.

4. The processor of claim 1, further comprising:
the instruction set of the processor having a global scope atomic instruction, wherein the global scope extends to all cores of the processor.

5. The processor of claim 1, wherein
the atomic instruction also has a global scope extending to all cores of the processor,
the global and local scopes are implemented by an identical instruction of the processor instruction set, and are differentiated by using two distinct virtual address spaces assigned to an identical physical address space containing the shared variable, and
the processor includes a memory management unit that performs virtual to physical address translations, and which assigns an "uncached" attribute to the virtual address space associated to the global scope.

6. The processor of claim 1, wherein
the local scope atomic instruction is a fetch-and-add instruction, having as an additional parameter an increment value, and
the cache controller is configured to add the increment to the variable.

7. A method for updating a variable shared between multiple similar processor cores, the method comprising:
distributing the cores in multiple groups assigned to respective distinct cache memories;
executing in a core of a given group an atomic read-modify-write instruction having a local scope limited to the given group, with a memory address of the shared variable as a parameter;
performing operations of the atomic instruction in the distinct cache memory of the given group, a cache line allocated to the memory address; and
locking the cache line locally to the given group while simultaneously authorizing read and write access to the shared variable by cores outside the given group during execution of the local scope atomic instruction.

8. The method of claim 7, further comprising the step of:
locking the cache line without invalidating nor locking an analogous cache line in the other cache memories.

9. The method of claim 7, further comprising the steps of:
defining the local scope of the atomic instruction through the execution of a dedicated instruction of the processor instruction set; and
including a dedicated atomic instruction of global scope extending to all cores in the processor instruction set.

10. The method of claim 7, further comprising the steps of:
translating a physical address space containing the shared variable from first and second distinct virtual address spaces through a memory management unit;
assigning an "uncached" attribute to the second virtual address space;
executing a generic atomic instruction with the first virtual address space for implementing a local scope; and
executing the same generic atomic instruction with the second virtual address space for implementing a global scope.

* * * * *